UNITED STATES PATENT OFFICE.

ERNST HANTKE, OF MILWAUKEE, WISCONSIN, ASSIGNOR TO ALFRED VON COTZHAUSEN, OF SAME PLACE.

FOOD COMPOUND AND METHOD OF MAKING SAME.

SPECIFICATION forming part of Letters Patent No. 613,765, dated November 8, 1898.

Application filed November 8, 1897. Renewed October 7, 1898. Serial No. 692,959. (No specimens.)

*To all whom it may concern:*

Be it known that I, ERNST HANTKE, a citizen of the United States, residing at Milwaukee, in the county of Milwaukee and State of Wisconsin, have invented certain new and useful Improvements in Food Products and Methods of Making the Same; and I do hereby declare the following to be a full, clear, and exact description of the invention, such as will enable others skilled in the art to which it appertains to make and use the same.

This invention relates to milk, milk products, and foods.

The objects are, without detracting from the qualities of good milk, as such, to present milk in a convenient, compact, and durable form, and with it, in this form, and with various cereal and other suitable products, to be able to present such products, at once, in a convenient, compact, and durable form, and according to their best and most wholesome exhibition, with a view to their best, avoiding all deleterious effects, and, furthermore, to be able to present the constituents of milk in a form in which they can be mixed as desired and most suitable with other matter.

With these objects in view the invention consists in preparing and presenting milk in dry form and in the substance thus prepared and presented; furthermore, in separating milk into its constituents and presenting the constituents in soluble form and with the exception of the cream and water each preferably in a powdered form, and, finally, the invention consists of the constituents of milk capable of being dried in powdered form.

Heretofore, so far as is known, no one has succeeded in presenting milk by itself in a durable concentrated form as a powder. The so-called "condensed milks" now on the market, with or without sugar, are mostly in liquid form, and after the vessel containing them has been opened they must be used in a very short time, otherwise they deteriorate. In all so-called "infant foods" the underlying principle is to place the starch in an easily soluble and digestible condition and to make the product tasteful by the addition of sugar. But all these articles, more or less valuable, can naturally never be a full substitute for milk. Perhaps the best are the so-called "malted meals" or "malt flours," which are mixed with milk and dried, though even these have the disadvantage that they can only be prepared for consumption with warm, not hot, water, inasmuch as hot water kills their diastase, and the matter then prepared cannot stand too long, as it is apt to turn sour and be injurious. The rational idea then would seem to be to prepare milk itself in a condition in which it will keep and be in a suitable form for preservation and transportation. To this end we have the various forms of so-called "condensed milk," with or without addition of sugar, and these substances containing sugar are not suitable for infants, as they are not digestible by them, and the preparations of so-called "condensed milk" without sugar do not remain homogeneous, but separate after sterilization, to which they must be subjected after the thickening, and the cream separates out and will not again mix with the remainder of the product. Furthermore, the so-called "condensed milks" are mostly fluids and therefore not readily preservable and transportable.

My idea and invention consist in placing milk in a stable pulverulent form, and to get the very best results from milk of course no cane-sugar should be added, because the product then on solution varies too much from the original composition of milk itself. The presentation of milk in a stable or unchangeable condition can never be attained by the mere thickening of the same. By my invention the separate constituents of the milk are isolated, though, of course, not to make the work too difficult most of the fat of the milk is first removed.

To carry my invention into effect, the cream is first separated from the milk. The skimmed milk is then heated, with the addition of a small quantity of a suitable acid—say phosphoric acid, in the proportion of, say, one ounce to the gallon, or hydrochloric acid. The milk-albumen and casein coagulate and are separated as one mass from the other constituents of the milk. This substance is now washed with water and alcohol until it is chemically pure, and after drying is in the nature of a white greasy substance. In this condition it is insoluble in water, but is then made soluble by treatment with an alkaline substance—say with an alcoholic solution of potash. By boiling the separated casein in alcoholic potash of the strength of two-thirds of an ounce of caustic potash to one gallon of absolute alcohol (95 to 96) solution it is transformed into casein-potash and is then filtered free from the alcohol, washed with alcohol, and then dried. The coagulate is then reduced to a powder; but with regard to the solubility of its matter this is in the original condition in which it existed in the milk. My preparation is a white powder. By the action of the potash in the alcoholic-potash solution the acid is neutralized and the salt formed is removed. The filtrate from the coagulate—the whey or milk-serum mixed, as it now is, with water and alcohol—is now steamed to a thin syrup, alcohol is added, the mass is cooled down, placed in suitable, preferably shallow, vessels, and the milk-sugar crystallizes out and is obtained chemically pure. The remainder is then evaporated to dryness, care being taken that the mass may not become too brown, and the mass is then incinerated. It is then dissolved in water and the solution is filtered, and the filtrate being then evaporated over coals the mineral salts from the milk are obtained. The first result is a dark gray or brown powder; but on purification the salts appear as a perfectly white powder.

In the foregoing manner I have thus obtained in a powdered and soluble form the principal ingredients in the milk—namely, albumen, casein, sugar, the mineral salts, and also traces of fat. The separate isolated products are then intimately mixed, and a perfectly white powder is produced having the full taste of milk. The powder is soluble in hot water and has the perfect smell and taste of milk. It is superior to so-called "infant-foods," because it is completely soluble and therefore perfectly digestible, and hence readily absorbed into the system and taken into the blood.

For grown persons my milk-powder may readily be mixed with other substances, and a series of articles of nourishment of specific character may thus be made. If the powder is mixed with a little syrup to a paste, tablets may be produced, and the powder may be mixed with chocolate, cocoa, and other ingredients, as may be desired and according to taste. I can mix the separated ingredients in any proportion desired. The mixture can be made in such manner that the solution of the mixture will be similar to mother's milk and be suitable for nourishment of infants or in such manner that the solution will be similar to cow's milk and be suitable for table use, or I may make mixtures to be equivalent to any other milk. Thus to every one hundred parts of milk-sugar I take for woman's milk thirty-seven parts of the prepared casein and five parts of the salts; for cow's milk, sixty parts of the prepared casein and sixteen and two-tenths parts of the salts; for ass's milk, thirty-seven parts of the prepared casein and two and eight-tenths parts of the salts; for mare's milk, thirty-eight and six-tenths parts of the prepared casein and six and one-tenth parts of the salts; for goat's milk, ninety-five and five-tenths parts of the prepared casein and sixteen and four-tenths parts of the salts, and for sheep's milk one hundred and twenty-five parts of the prepared casein and nineteen and eight-tenths parts of the salts.

To produce a product similar to natural milk with the above mixtures, I add to each pint of water for woman's milk one and three-tenths ounces of the mixture; for cow's milk, two ounces of the mixture; for ass's milk, one and one-half ounces of the mixture; for mare's milk, one and one-half ounces of the mixture; for goat's milk, two ounces of the mixture, and for sheep's milk three ounces of the mixture.

In order to have a general product, I may make the mixture suitable for woman's milk, which is substantially like that for mare's and ass's milk, and take thereof to each pint of water two ounces or for cow's milk three and one-half to four ounces.

The separate powders formed or the composite powder formed by mixture of all will not change or spoil in any way and is ready for use at all times by suitable solution in water.

The composite powder can also be used in its dry form and is a healthful food of natural composition on account of its ready digestibility. It is a particularly elegant production on account of its ready solubility in water. As a powder it is tasteless and odorless, and the solution in water has the full taste of milk.

By separating and mixing the ingredients I have obtained a milk-powder which has the following composition: Water, 5.40 per cent.; fat, 0.82 per cent.; milk-sugar, 71.08 per cent.; casein, 14.70 per cent.; mineral salts, 0.80 per cent; phosphoric acid, 0.32 per cent.

In order to give the milk a higher percentage of fat, a small proportion of the cream or milk-fat may be added, or I may add other suitable fats, such as oil of theobroma—that is, cocoa-butter.

The production of this milk-powder is comparatively inexpensive, costing less than any other preparation of milk now on the market.

The complete milk product thus obtained, particularly without the fat, may be mixed with cereal or other products for the purpose of producing so-called "infant-foods," and a decided advantage, owing to the solubility of my completed product, is that the preparations thus established—for example, my lacto-wheat malt—that is to say, a malted wheat-milk—need not be boiled, which destroys the diastase. Having prepared this wheat-malt milk with wheat-malt and my milk-powder, the preparation may be stirred with lukewarm water of about 145° to 150° Fahrenheit, whereby the diastase obtains its full effect, and at the same time all substances soluble at this temperature will have been rendered digestible and will be readily absorbed by the system. By treatment with cold water very little would be dissolved, while by treatment with boiling water or water too hot the diastatic power would be destroyed.

By mixture of my milk product with various forms of flour, grits, germos or germ-flour, &c., the nourishing effect of these substances is increased from the fact that my milk product contains soluble albumen and assimilable phosphates.

In making the food products with my milk preparation it is best to grind up the prepared cereals with the milk-powder.

In preparing my milk-powder for diabetics, for whom food containing sugar or starch is strictly prohibited, I may in the preparation of my composite powder omit the milk-sugar, and in making foods with my milk-powder I would choose such as have had the greatest proportion of starch removed, but containing, say, gluten. I particularly produce a preparation containing no carbohydrates.

Having thus fully described my invention, what I claim as new, and desire to secure by Letters Patent of the United States, is—

1. The process of preparing milk in powdered form, which consists in skimming off the cream, then forming a coagulate, washing this with water and alcohol, rendering it soluble and pulverizing it, evaporating the serum or filtrate, which has been separated, crystallizing the milk-sugar and separating this, then drying the remainder, incinerating it and separating from it the milk salts, and, finally, mixing the separate products, substantially as described.

2. The process of obtaining soluble casein, which consists in taking skimmed milk, coagulating the casein, removing from it the whey or milk-serum, washing the casein with water and alcohol, and then converting it into soluble form, substantially as described.

3. The process of obtaining casein in a pulverulent form, which consists in taking skimmed milk, coagulating the casein, removing from it the whey or milk-serum, washing the casein with water and alcohol, then converting it into soluble form and then drying and pulverizing, substantially as described.

4. A dry milk product containing the hereinbefore-described dry, water-soluble coagulate from milk, milk-sugar, and the mineral salts of milk, substantially in the proportions described.

5. A dry, pulverulent milk product containing the hereinbefore-described dry, pulverized, water-soluble coagulate from milk, milk-sugar, the mineral salts of milk, and fat, the whole being intimately mixed and in the form of a dry powder, substantially in the proportions for the purposes described.

6. As a new article of manufacture, the above-described dry, water-soluble casein.

In testimony whereof I affix my signature in presence of two witnesses.

ERNST HANTKE.

Witnesses:
   ALFRED VON COTZHAUSEN,
   C. JOS. MUELLER.